No. 621,445. Patented Mar. 21, 1899.
E. CAMPBELL & C. B. WOODWORTH.
GRASS CATCHER FOR LAWN MOWERS.
(Application filed June 21, 1898.)
(No Model.)
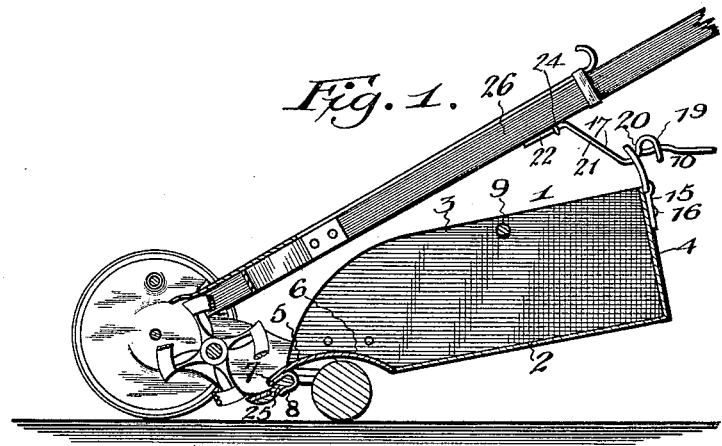
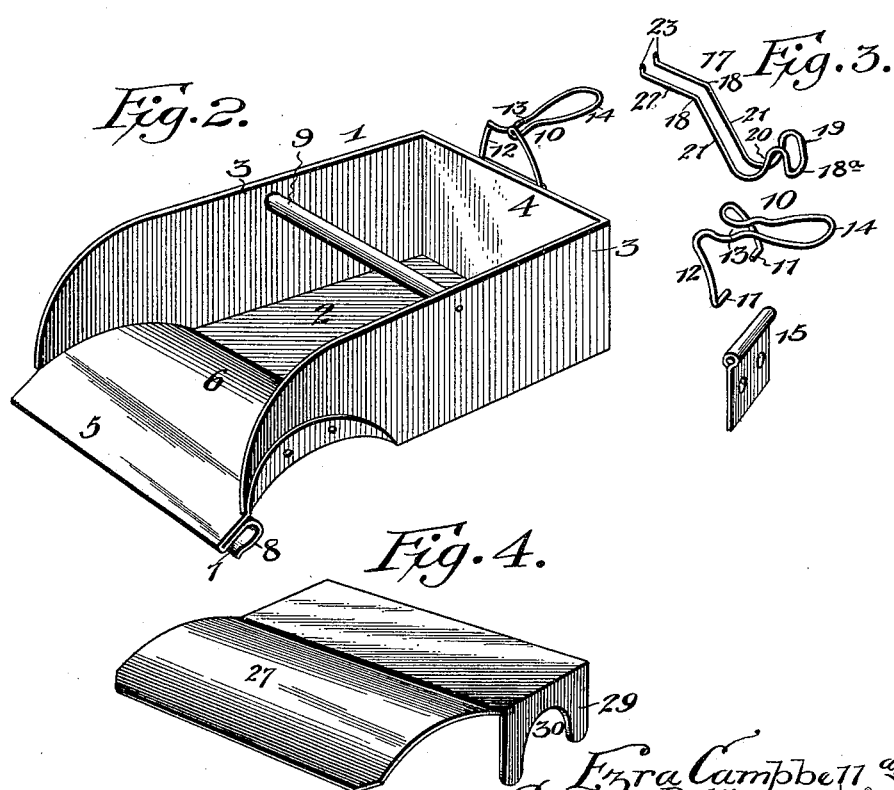
Witnesses
A. Roy Appleman
[signature]
By their Attorneys
Ezra Campbell and
Cyrus B. Woodworth, Inventors.
C. A. Snow & Co.

UNITED STATES PATENT OFFICE.

EZRA CAMPBELL AND CYRUS B. WOODWORTH, OF DAYTON, WASHINGTON.

GRASS-CATCHER FOR LAWN-MOWERS.

SPECIFICATION forming part of Letters Patent No. 621,445, dated March 21, 1899.

Application filed June 21, 1898. Serial No. 684,078. (No model.)

*To all whom it may concern:*

Be it known that we, EZRA CAMPBELL and CYRUS B. WOODWORTH, citizens of the United States, residing at Dayton, in the county of Columbia and State of Washington, have invented a new and useful Grass-Catcher for Lawn-Mowers, of which the following is a specification.

Our invention relates to improvements in grass-catchers for lawn-mowers; and the primary object that we have in view is to provide an improved construction by which the receptacle may be quickly detached from the machine for the purpose of emptying the load thereof without inverting the mower in order to empty the receptacle and without dumping the grass on the lawn.

A further object of the invention is to provide an improved attachment which enables the ready passage of the grass into the same from the cutter apparatus of the mower, retains the grass against accidental loss, and allows the receptacle to be nested compactly with other receptacles for shipment or storage.

A further object of the invention is to provide a device which is simple and durable in construction, cheap of manufacture, easily applied to ordinary kinds of mowers, and is efficient and reliable in service.

With these ends in view the invention consists in the novel construction and arrangement of parts, which will be hereinafter fully described and claimed.

To enable others to understand the invention, we have illustrated the preferred embodiment thereof in the accompanying drawings, forming a part of this specification, and in which—

Figure 1 is a sectional elevation of a lawn-mower with a grass-catcher applied thereto which is constructed in accordance with our invention. Fig. 2 is a perspective view of the grass-catcher detached from the mower. Fig. 3 is an enlarged detail view of the latch and its keeper, which are to be applied to the grass-receptacle and the mower handle-bar, respectively. Fig. 4 is a modified construction of the front plate adapted to form a part of the grass-receptacle.

Like numerals of reference denote like and corresponding parts in each of the several figures of the drawings.

The grass-receptacle 1 of our attachment consists of a bottom 2, the side walls 3, the rear wall 4, and a front plate 5. The receptacle proper, which is composed of the bottom and the side and rear walls, may be made of any suitable material—as, for example, sheet metal, wood, fabric, wire screen, or any other suitable material; but the front plate should be made of sheet metal, because it provides one means for conveniently attaching the receptacle at its front edge to the mower-bar, having the shear-plate of the mower attached thereto. This metallic front plate 5 is curved at its rear portion, as at 6, to enable it to lie snugly over the roller of the mowing-machine, and the front edge of said plate 5 is constructed for attachment to the shear-plate bar. For use with some types of mowing-machines the front plate shown by Figs. 1 and 2 is stamped from a piece of sheet metal, with ears or lugs at its front edge and near the sides thereof. This front edge of the plate is bent or doubled to lie under the plate, as at 7, and the ears or lugs are then bent or curved to form the clips 8, which are slightly elastic, so as to grip one edge of the mower-bar. We prefer to unite the side walls 3 of the grass-receptacle by a tie bar or stay 9, which is removably secured in place for the purpose of nesting the receptacle with other similar receptacles, and thus enable the devices to be packed compactly for transportation or storage. The receptacle of our attachment is not truly rectangular; but the side walls thereof converge slightly toward the rear, and the bottom is tapered slightly, thus making the rear end of the receptacle narrower than the front end thereof. This construction of the receptacle in tapered form is advantageous for two reasons—first, it enables the grass to pass freely into the receptacle from the rotary cutter apparatus of the mower, and, second, the receptacles can be nested to the best advantage. The removable front plate 5 is fitted between the side walls at the open front end of the receptacle, and the rear edge of the curved portion of said front plate is in the plane of the bottom 2 of the receptacle. This bottom plate is thus compactly arranged in the receptacle, and it is secured thereto by any suitable means. It will be understood that the receptacle when made of sheet metal may have its bottom shaped equivalent to the plate 5; but in the manufacture of the receptacle from materials other than sheet metal we prefer to employ a removable front plate constructed substantially as described.

The front plate shown by Figs. 1 and 2 and heretofore described is not well adapted for use on certain styles of lawn-mowers, and to enable the attachment to be used on that class of mowers for which the plate 5 cannot be used we contemplate the provision of a metallic plate of the construction shown by Fig. 4. This metallic plate is also preferably of sheet metal stamped in a single piece, with the curved portion 27 and with lugs or ears 29 at the sides of the straight portion of the plate, and these lugs or ears are bent downwardly at the sides of the plate and are provided with the curved recesses 30 for the purpose of fitting snugly to the mower-bearings, in which the rear trailing roller of the mowing-machine is journaled. It is obvious that when a removable plate is employed at the front open end of the receptacle 1 either style of plate may be used interchangeably, and the attachment is thus well adapted for service on different kinds of mowers.

We will now proceed to describe the latch mechanism by which the rear closed end of the grass-receptacle is detachably connected to and suspended from the handle-bar of the lawn-mower, and we desire to preface the description of this part of our invention by remarking that the latch mechanism is especially constructed with a view to facilitating the removal of the receptacle from the machine and to add to the security of the attachment to the handle-bar.

The latch 10 is preferably bent from a single piece of wire of sufficient strength to stand the strain and weight of the loaded receptacle, on which the latch is pivotally hung to adapt it for engagement with the keeper on the handle-bar. In bending the latch from a piece of wire it is first doubled upon itself and brought inwardly to provide the thumb or finger piece 14, after which the strands are carried in parallel relation to each other to form the shank 13. The strands are then separated and curved laterally to the shank to form the arms 12, and finally the extremities of the strands are bent inwardly in coincident planes to produce the pivotal ends 11. The shank and thumb-piece of the latch lie substantially at right angles to the arms 12, and the arms extend in opposite directions from the contiguous parallel lengths of the strands, which form a relatively stiff shank 13. The latch constructed as described is loosely attached to the rear wall of the receptacle, near the upper edge thereof, by means of a clip 15, which is bent from a piece of sheet metal to form a loop adapted to receive the pivotal ends 11 of the latch, and this clip is firmly united to the receptacle by the transverse rivets 16, which pass through the clip and the receptacle.

The latch, which is pivotally attached to the receptacle, is adapted to be quickly and easily engaged with a spring-keeper 17, that is rigidly secured in a substantial manner to the under side of the handle-bar, and in the preferred construction of this spring-latch it is made or bent from a piece of wire. In bending the wire we first double the same upon itself to provide the strands 18, which are joined together at their front ends by a cross-bar 18ª, in rear of which the strands are curved upwardly, as at 19, then downwardly, as at 20, then inclined for a part of their length at 21, then extended in a straight line at 22, and finally bent to form the prongs 23. In attaching the keeper to the mower handle-bar the prongs 23 are forced or embedded into the handle-bar, and staples 24 are driven into the handle-bar, so as to embrace the straight lengths 22 of the keeper. These lengths of the keeper bear firmly against the lower side of the handle-bar, and the keeper is thus adapted to be firmly and substantially attached to the bar. The inclined lengths 21 of the keeper depend below the face of the bar, while the bowed portion at the free end of the keeper extends upwardly toward the lower face of the bar, the inclined and curved portions 21 and 20 respectively forming a seat in the keeper adapted to receive the angular portion 12 of the latch.

To connect the rear end of the receptacle to the handle-bar, the receptacle is lifted a sufficient distance for the widened pivoted end of the latch to extend above the humped free end of the keeper, and the latch is then moved forward on its pivotal connection with the clip 15 for the angular end 12 to pass over the curved portions 19 and 20 of the keeper, the shank 13 of the latch fitting in the space between said curved ends 19 and 20 of the keeper, while the shank rests upon the cross-bar 18ª. It will thus be observed that the strands of the keeper lie on opposite sides of the shank, that the shank rests upon the cross-bar 18ª of the keeper, and that the angular portions 12 of the latch fit in the seat formed by the curved portions 20 and 21 of the keeper. The latch is thus detachably connected to the keeper to hold the receptacle in place on the handle-bar against accidental disengagement, and the latch and keeper also serve to suspend the closed rear end of the receptacle from the handle-bar. To release the receptacle, the latch is depressed on its pivotal connection with the clip 15 for the purpose of withdrawing the shank and shoulder looped end thereof from the keeper, and this operation may be quickly and easily effected without dumping the receptacle and precipitating its load upon the lawn.

To enable others to understand the invention, we have shown it applied to an ordinary lawn-mower in Fig. 1, referring to which the numeral 25 indicates the bar to which the shear-plate of the cutter apparatus is applied, while the handle-bar is indicated at 26.

To apply our improvements to an ordinary lawn-mower, the keeper 17 is secured to the under side of the handle-bar in the position shown by Fig. 1 and by the means heretofore described. The clips 8 at the open front end of the receptacle are fitted to the bar 25, and the rear end of the receptacle is lifted for the latch to engage with the keeper. The grass as it is cut by the rotary cutter apparatus is thrown rearwardly into the open front end of the receptacle, and the curved portion 6 of the plate 5 prevents the grass from falling out of the receptacle. When the receptacle is loaded, it is not necessary to invert the machine nor to dump the grass upon the lawn; but the receptacle may be detached by releasing the latch and withdrawing the clips from the mower-bar 25, after which the receptacle may be carried to a place of discharge and emptied thereat, or the receptacle may discharge its load into a bag or other suitable contrivance.

It is evident that changes in the form and proportion of parts may be made by a skilled mechanic without departing from the spirit or sacrificing the advantages of the invention.

Having thus described the invention, what we claim is—

1. The combination with a mower handle-bar, and a grass-receptacle, of the keeper fastened to said handle-bar to extend downwardly and rearwardly therefrom and provided with a curved seat, 20, and the loop at its rear end, and an angular latch pivoted to said receptacle, said latch having the finger-piece and the arms which extend outwardly from the finger-piece, the latch being arranged on the receptacle for its arms to fit in the seat of the keeper and its finger-piece to enter the looped rear end of said keeper, for the purpose described, substantially as set forth.

2. A means for detachably suspending a grass-receptacle from a mower handle-bar comprising a keeper having the looped rear end, the inclined arms, and the curved seat portion, 20, between the looped end and the inclined arms, an angular latch provided with a finger-piece and with the arms which are projected in opposite directions to and downwardly from said finger-piece to terminate in pivotal pins, and a plate having an ear to receive the pivotal pins of said latch and support the same in a position for the latch-arms to occupy the keeper-seats and the finger-piece to enter the keeper-loop, substantially as described.

In testimony that we claim the foregoing as our own we have hereto affixed our signatures in the presence of two witnesses.

EZRA CAMPBELL.
CYRUS B. WOODWORTH.

Witnesses:
GEO. B. BAKER,
D. C. GUERNSEY.